(12) United States Patent
Langworthy et al.

(10) Patent No.: US 8,763,093 B2
(45) Date of Patent: Jun. 24, 2014

(54) ACCESS CONTROL MANAGEMENT

(75) Inventors: David E. Langworthy, Medina, WA (US); Qian Wang, Seattle, WA (US); Andrew John Layman, Bellevue, WA (US); John Peter Shewchuk, Jr., Redmond, WA (US); Shiung-Vei Yong, Sammamish, WA (US); Charles Edgar Passmore, Seattle, WA (US); Hervey Oliver Wilson, Bellevue, WA (US); Caleb Geoffrey Baker, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/230,799

(22) Filed: Sep. 12, 2011

(65) Prior Publication Data

US 2013/0067539 A1    Mar. 14, 2013

(51) Int. Cl.
*G06F 17/30* (2006.01)
*G06F 15/16* (2006.01)
*G06F 7/04* (2006.01)
*G06F 21/00* (2013.01)

(52) U.S. Cl.
CPC ...................................... *G06F 21/00* (2013.01)
USPC ............................................... 726/4; 713/170

(58) Field of Classification Search
USPC .............................................................. 726/4
See application file for complete search history.

(56) References Cited

U.S. PATENT DOCUMENTS

| | | | | |
|---|---|---|---|---|
| 5,958,050 A | * | 9/1999 | Griffin et al. | 726/1 |
| 7,748,046 B2 | * | 6/2010 | Johnson et al. | 726/27 |
| 2003/0065940 A1 | * | 4/2003 | Brezak et al. | 713/201 |
| 2003/0229792 A1 | * | 12/2003 | Baldwin et al. | 713/185 |
| 2005/0262353 A1 | * | 11/2005 | Gentry et al. | 713/176 |
| 2006/0129817 A1 | * | 6/2006 | Borneman et al. | 713/170 |
| 2007/0186106 A1 | * | 8/2007 | Ting et al. | 713/168 |
| 2007/0204168 A1 | * | 8/2007 | Cameron et al. | 713/185 |
| 2010/0154041 A1 | | 6/2010 | Dalzell | |
| 2011/0066602 A1 | * | 3/2011 | Studer et al. | 707/690 |

OTHER PUBLICATIONS

Sudhir Agarwal; Credential Based Access Control for Semantic Web Services; Year: 2004; AAAI.org; pp. 1-8.*
Authentication and Authorization with WCF (part 3)—Claims-Based Authorization; Mar. 29, 2011.
The Role of the Claims Engine; Mar. 29, 2011.
Gail-Joon Ahn, User-portable device and method of use in a user-centric identity management system; Open Invention Network L.L.C. (Durham, MC), Dec. 3, 2009.
Claims Transformation from IBM, Mar. 29, 2011.
Enhancing User Authentication in Claim-Based Identity Management, May 17-21, 2010.
Claims-Based Architectures, Mar. 29, 2011.

* cited by examiner

*Primary Examiner* — Philip Chea
*Assistant Examiner* — Monjour Rahim
(74) *Attorney, Agent, or Firm* — Ben Tabor; Kate Drakos; Micky Minhas

(57) ABSTRACT

The subject disclosure relates to authorization based on a determination of permissions that can be granted for an action (s) to be performed on a resource. The determination of the permission is based on a set of rules that represent a theory including a notion of trust that has been divided into different sized tables. The tables are utilized to evaluate two or more input claims and to facilitate a determination of whether access to at least one system resource is to be granted. The evaluation can include matching the two or more input claims to rows in the table, wherein access is allowed if a match is found.

13 Claims, 15 Drawing Sheets

ACCESS CONTROL MANAGEMENT

TECHNICAL FIELD

The subject disclosure generally relates to device authorization and access control management.

BACKGROUND

As computing technology advances and computing devices become more prevalent, computer programming techniques have adapted for the wide variety of computing devices in use. Such computing devices can be utilized in a distributed network, wherein computer programming and data is distributed, or spread out, over more than one computing device. Further, the computing devices can be utilized to interact with other devices and/or systems over the distributed network.

In view of the wide variety and uses of computing devices, access control, including approval or authorization of a computing device (e.g., approval or authorization of the user of the computing device) is utilized to help maintain integrity of computing systems (including distributed networks and computing devices). Access control is also utilized to protect the security of the computing systems and the computing devices. Such access control can also help ensure that third parties (e.g., a rogue user) is not able to obtain sensitive information or information that should be protected from viewing by others (e.g., third parties). Further, access control can be utilized to mitigate the distribution of sensitive or private information to third parties.

Conventional systems, however, can fail to properly authorize a device. For example, some conventional systems verify only a single piece of information (e.g., a domain, an email address, and so forth) to perform the authorization, which can allow access to devices (e.g., device users) that are not allowed to gain access (e.g., a rogue user circumvented the authorization procedures). In conventional systems that verify more than one piece of information, the verification procedure is cumbersome and not sensitive to time concerns, which can result in a negative user experience.

The above-described deficiencies of today's computing system and access control techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Aspects disclosed herein relate to access control through the use of two or more portions of information signed by an issuer, such as identity information, to derive a set of possible output claims. The two or more portions of information are referred to as input claims. In some aspects, access control is provided where the decision logic is removed from the application in order to improve efficiencies of the access control functions and decisions.

In an aspect, two or more input claims can be expanded into one or more output claims (or a set of output claims), which are utilized to selectively authorize access to system resources. In an example, the two or more input claims can include facts that are applied to a data structure in order to expand the input claims into the set of output claims. In another example, the set of output claims are matched to an authorization table in order to determine whether access to the system resources can be authorized.

In some aspects, two or more input claims, which can be associated with a device (e.g., a device user) are expanded into a set of output claims. The set of output claims are matched to rows in an authorization table that contain matching resource claims, subject claims, and action claims. In some aspects, wildcards (such as variables) can be utilized for one or more of the resource claims, subject claims, and/or action claims. If there is a match, it indicates the device is authorized to access the system. If a match is not found, access to the system can be denied. In such a manner, access to (and integrity of) the system and its resources can be maintained.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
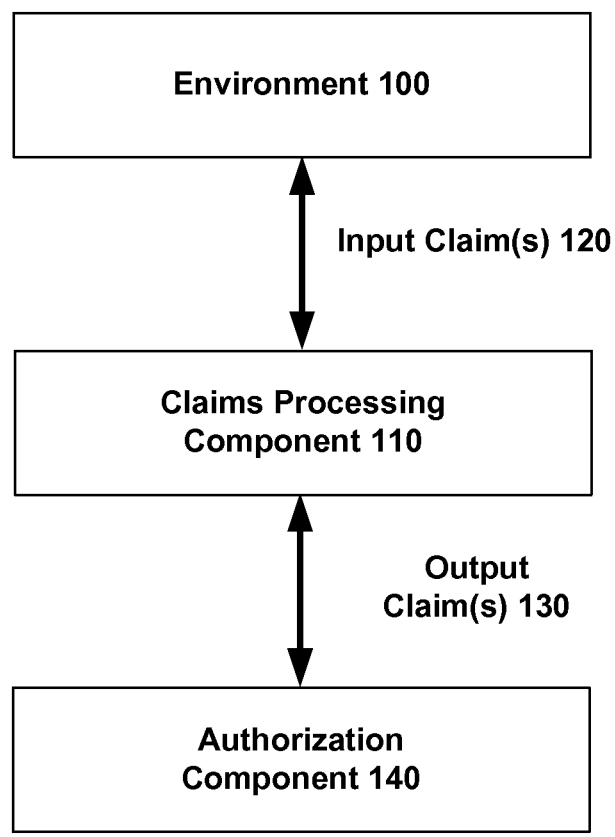
FIG. 1 illustrates a block diagram of an exemplary computing system, according to an aspect.

With the utilization of computing resources, it is beneficial to quickly determine whether a user has permission to perform various actions on the computing resource. Thus, access control is an integral piece of business logic. For example, businesses rely on the secure management of resources to help ensure that sensitive information and/or other information is not mishandled or compromised.

Thus, it would be beneficial to provide an externalized authorization service that can offload the decision logic from the application to improve manageability, scalability, and separation of responsibility. For example, it would be beneficial to allow business administrators the ability to control the authorization policy without having to change the application.

An aspect relates to an access control system that includes a claims processing component configured to expand two or more input claims associated with a device into a set of output claims. The access control system also includes an authorization component configured to match the set of output claims to an authorization table for rows that contain a matching resource claim, a matching subject claim, and a matching action claim to indicate the device is authorized to access a system resource. In an example, an input claim and an output claim comprises identity information signed by an issuer.

In an example, the claims processing component is further configured to apply facts associated with the two or more input claims against a data structure to expand the two or more input claims into the set of output claims. Further to this example, the claims processing component is further configured to apply the facts against the data structure at each iteration. At each iteration, the current set of input claims and produced claims (sometimes referred to as derived claims) are matched against all the rules, according to an aspect.

In another example, the authorization component is further configured to match the set of output claims to an authorization table. In a further example, the claims processing component is configured to verify a matching row in a rules table for a plurality of the two or more input claims and creates a first output claim.

In another example, the claims processing component is configured to produce a first output claim by matching a first input claim, a second input claim, or both the first input claim and the second input claim with at least one row in a rules table. Further to this example, the claims processing component is configured to assign a type and a value of the matched row to the first output claim.

According to another example, the authorization component is configured to match the set of output claims against the authorization table and allow access to the system resource. Further to this example, the authorization table comprises a plurality of rows, wherein each row comprise a resource claim, a subject claim, and an action claim.

Another aspect relates to a method that includes receiving an authorization request and expanding a first input claim and a second input claim into a set of output claims. The method also includes correlating a plurality of output claims in the set of output claims to an authorization table and authorizing an action for the first input claim and the second input claim as a result of correlating the plurality of output claims.

In an example, expanding the first input claim and the second input claim includes verifying a row in a rules table matches the first input claim and the second input claim and creating a first output claim as a function of the verification.

In another example, expanding the first and second input claims further includes matching the first input claim and the second input claim with a row in a rules table and producing a first output claim based on the matching. Further to this example, producing the first output claim comprises assigning a type and a value of the matched row to the first output claim. In some aspects further to this example, expanding the first and second input claims further includes matching the first output claim and either the first input claim or the second input claim with another row in the rules table and producing a second output claim as a result of the matching. The second output claim comprises a type and a value of the other row.

In an example, expanding the first and second input claims further comprises corresponding an input issuer, a type, and a value of the first input claim or the second input claim with a row in a rules table. In a further example, authorizing the action includes evaluating the set of output claims against an authorization table that comprises rows. The evaluation is performed based on at least one row that comprise a resource claim, a subject claim, and an action claim. Further to this example, the authorization includes allowing authorization based on the evaluating.

Another aspect relates to a computer-readable media comprising computer-executable code instructions stored therein, wherein in response to execution by at least one processor, the computer-executable code instructions perform operations. The operations comprise expanding two or more input claims associated with a device into a set of output claims and corresponding the set of output claims to an authorization table for rows that contain a matching resource claim, subject claim, and action claim to indicate the device is authorized to access a system resource.

In an example, the two or more input claims and the set of output claims comprise a piece of identity information signed by an issuer. In another example, the computer-executable code instructions perform further operations comprising applying facts associated with the two or more input claims against a data structure to facilitate the expanding.

Herein, an overview of some of the embodiments for access control management has been presented above. As a roadmap for what follows next, various exemplary, non-limiting embodiments and features for access control management are described in more detail. Then, some non-limiting implementations and examples are given for additional illustration, followed by representative network and computing environments in which such embodiments and/or features can be implemented.

Access Control Management

By way of further description with respect to one or more non-limiting ways to provide access control, a block diagram of an exemplary computing system is illustrated generally by FIG. 1. The exemplary computing system allows for access control that employs rules where two or more input claims are utilized to produce an output claim or a set of one or more output claims. As utilized within this detailed description, a "claim" is a portion of identity information that is signed by an issuer. For example, the identity information can be cryptographically signed by the issuer, or entity that verified the identity information and is considered a trusted source. A claim can be trusted to a similar degree as the issuer is trusted. Thus, authorization rules can be described through claim transformation. In more detail, a "rule" describes how an input claim from a trusted issuer can be transformed to an output claim. For example, a rule states that a full time employee is trusted to be a reader. Thus, if a user is included in the group "full time employee", then the user has the role of "reader" based on the implicit trust described in the rule. Further, as utilized herein, a "policy" is logic that determines whether a set of subject claims, resource claims, and/or action claims are permitted.

The disclosed aspects utilize two different types of tables, which are a rules table and an authorization table. The rules table establishes the rules that are to be satisfied (by two or more input claims) in order to derive one or more output claims. The authorization table is utilized to determine whether access to a system and/or system resource(s) should be granted (e.g., the user authorized). For example, output claim(s) are compared against rows in the authorization table. If the comparison results in an output claim matching a row, access is allowed. If at least one output claim does not match a row in the authorization table, access is denied. In an aspect, a conditional rules table is utilized. A conditional rules table has two or more sets of actions that are to be satisfied by input claims for the row to be true. If true, output claims are created and access can be allowed (based on results of an authorization table). If the two or more sets of actions (or claims) are not satisfied by the input claims, the output of the row is false and no output claims are created (and access is denied).

From a high-level view, there are at least two stages for access control management, which are claims expansion and authorization. For example, a set of input claims are expanded into a set of possible output claims. Then, the output claims are matched against an authorization table to determine whether the input claims result in a permitted action. If the input claims result in a permitted action, access is authorized. If the input claims do not result in a permitted action (e.g., the output claims are not matched to the authorization table), access is denied.

The computing system illustrated in FIG. 1 includes an environment 100, which can be a distributed network or a distributed directory. In some aspects, the environment 100 is associated with one or more personal devices, such as a mobile device, where each of the personal devices can be associated with different users. In other aspects, the environment 100 is associated with a distributed network and personal devices are configured to operate based on operation parameters of the distributed network. For example, a business can provide computing capabilities over a distributed network. Additionally, the business can provide its employees with personal devices (e.g., cell phone, laptop, PDA (Personal Digital Assistant), and so forth), where the personal devices operate according to the operation parameters established by the business.

Also included in computing system is a claims processing component 110 configured to expand input claims 120 into a set of output claims 130. For example, there can be a multitude of input claims and sets of two or more of the multitude of input claims can be expanded into a possible set of output claims. The set of output claims 130 can include one or more output claims, according to an aspect. The expansion of input claims into output claims can occur during each iteration, where new output claims are created by taking each set of two or more current input claims (e.g., a first input claim, a second claim, and so on) and checking to determine if there is a matching row in a rules table that has the same input issuer, type, and value. If there is a matching row, the claims processing component 110 is configured to produce an output claim with the same type and value as in the matching row. In an aspect, the produced output claim can include the issuer "LOCAL AUTHORITY". In an aspect, the issuer, LOCAL AUTHORITY, relates to the apparatus, system, or method that matched the input claims and produced the one or more output claims. In some aspects, the input claims are expanded into the output claims based on a set-oriented approach.

An authorization component 140 is configured to match the set of output claims 130 to an authorization table for rows that contain matching (e.g., identical or wildcard) resource claim(s), subject claim(s), and action claim(s). If a match exists, then the user is authorized to access one or more system resources. If a match does not exist, the user is not authorized and access to system resources is denied. In some situations, the two or more input claims do not result in an output claim and, therefore, access is denied.

An advantage of the disclosed aspects is that two or more input claims can be mapped to an output claim. In an aspect, the mapping is performed through the utilization of tables, which might be different sized tables. For example, the mapping can result in permission to access system resources based on a set of rules that represent a theory that has been divided into different sized tables. In an aspect, the theory can include notions of trust. For example, in a claims expansion phase, current input claims can be matched against a regular rules table and/or to a conditional rules table in order to produce output claims.

In an embodiment, the computing system illustrated by FIG. 1 can differ in operation from conventional computing systems in order to provide additional benefits over those achievable by computing systems that employ conventional access control systems. For instance, the computing system disclosed herein can utilize additional logic in terms of how rules are expressed. For example, sometimes two or more input claims are to be satisfied before an output claim is generated. In another example, more than two input claims are to be satisfied to generate the output claim.

In some aspects, the computing systems disclosed herein can be utilized with propositional logic, which is related to simple declarative propositions (e.g., if it is raining, then the sidewalks are wet). According to an aspect, the computing systems herein can be utilized with predicate logic, which can utilize variables that can be quantified (e.g., if it is raining "somewhere", then the sidewalks are wet "there", where the terms "somewhere" and "there" are variables). Additionally or alternatively, the computing systems can be utilized with trust logic. Trust logic can be based on explicit information and/or implicit information. In an example, if explicit information is provided (e.g., user has credentials XYZ) and the information directly matches to authorization of system resources (e.g., user with credentials XYZ can access system resources), then access to the system resources is allowed. In an example of implicit trust, access to the system resources is allowed based on an indirect match (e.g., provided information is that "user with credentials ZYX is a part time employee" and an authorization table indicates "part time employees can access system resources"). In this example, although user credentials ZYX are not matched directly to access of system resources, there is an indirect (e.g., trust logic) that access is to be allowed based on an indirect match (e.g., part time employees can access system resources).

Further, the disclosed aspects can be utilized to operate with other forms of logic in addition to, or in place of, propositional logic, predicate logic, and/or trust logic.

An overview of logic and logical assumption will now be reviewed with a simple example relating to the weather and, in particular, to rain. In this example, a proposition, such as "If it is raining, then the sidewalks are wet" is provided and propositional logic is applied. Thus, it can be said that if it rains it is wet:

Rains→Wet

Taking this example further, another propositions can be: "If it is raining in Detroit, then the sidewalks are wet in Detroit":

Rains_Detroit→Wet_Detroit
or
Rains(Detroit)→Wet(Detroit)

Another proposition can be "If it is raining in LA, then the sidewalks are wet in LA":

Rains_LA→Wet_LA
or
Rains(LA)→Wet(LA)

The next example applies predicate logic to a proposition in order to obtain an output. In this example, the proposition is: "If it is raining somewhere, then the sidewalks are wet there", where "somewhere" and "there" are variables. Based on this proposition and inserting locations in place of the variables, it can be said that: "If it is raining in Sacramento, the sidewalks are wet in Sacramento". It can also be said that if it is raining in Bismark, the sidewalks are wet in Bismark", and so forth. Since stating the entire proposition ("If it is raining somewhere, then the sidewalks are wet there") can be cumbersome, the proposition can be reduced to:

Rains(X)→Wet(X)

where X is a variable.

Continuing the above example and applying trust logic, another proposition is: "If RadioStation1 says it is raining in Detroit, then the sidewalks are wet in Detroit" and a further proposition is: "If RadioStation2 says it is raining in LA, then the sidewalks are wet in LA", which can be expressed as:

RadioStation1 says Rains(Detroit)→Wet(Detroit)
RadioStation2 says Rains(LA)→Wet(LA)

For example, RadioStation1 is trusted for providing weather conditions in the Detroit area since it is a radio station located in Detroit. The determination of whether (or not) it is RadioStation1 providing the weather information for Detroit is determined based on identity information contained in the information. For example, the identity information can be provided when RadioStation1 cryptographically signs the information being sent (e.g., the weather condition in Detroit). Since RadioStation1 cryptographically signed the information, the information is implicitly trusted to the degree that RadioStation1 is trusted. For example, the information is trusted for Detroit but not for LA (since RadioStation1 is not trusted for LA). Thus, if RadioSation1 says Rains (LA) and provides its identification, it does not follow that the sidewalks are wet in LA because there is no implicit trust for RadioStation1 as applied to LA.

The implicit trust can be applied in a multitude of different circumstances. For example, implicit trust can be utilized to decide if someone can log in to a system in order to obtain email (e.g., can this email software interact with the person (or device) logging in?). In another example, implicit trust can apply to permissions that are to be granted to a user based on identification information of the user.

Continuing the above example, even though RadioStation1 is not trusted for LA, the National Oceanic and Atmospheric Administration (NOAA) might be trusted for all areas. Thus, "If NOAA says it is raining somewhere, then the sidewalks are wet there", where the terms "somewhere" and "there" are variables, and which can be stated as:

NOAA says Rains(X)→Wet(X)

where X is a variable.

As another example, implied trust can be associated with various airports as it relates to the weather. For example, an airport in Detroit is the Detroit Metropolitan Wayne County Airport (DTW), which is trusted by the NOAA to obtain weather information in the Detroit area. In a similar manner, Los Angeles International Airport (LAX) is trusted by NOAA for weather information in LA. Therefore, "If DTW says it is raining in Detroit, then NOAA says it is raining in Detroit" and "If LAX says it is raining in LA, then NOAA says it is raining in LA", which can be stated as:

DTW says Rains(Detroit)→NOAA says Rains(Detroit)
LAX says Rains(LA)→NOAA says Rains(LA)

Expanding on the above, the following relates to inference or deriving logical conclusions from something that is known or that is assumed to be accurate. In this example, preliminary fact(s) are provided and a determination is made as to what other facts can be derived from the preliminary fact(s). For example, the following mapping theory is provided (e.g., A→B, indicates "if 'A' then 'B'"):

A→B
B→C
C→D
E→F
Q→R

For this example, fact "A" is known (or is provided). By taking "A" and reviewing the above mapping, "B" can be determined (e.g., during a first iteration) since A→B. During a second iteration, "C" can be determined because, according to the above mapping, B→C. In a third iteration, "D" can be determined because C→D, as illustrated in the above mapping. During a fourth iteration, there is no other information that can be determined because there are no further mappings for "A", "B", "C", and/or "D". Thus, the mapping is discontinued until further information is provided.

Figure 2:
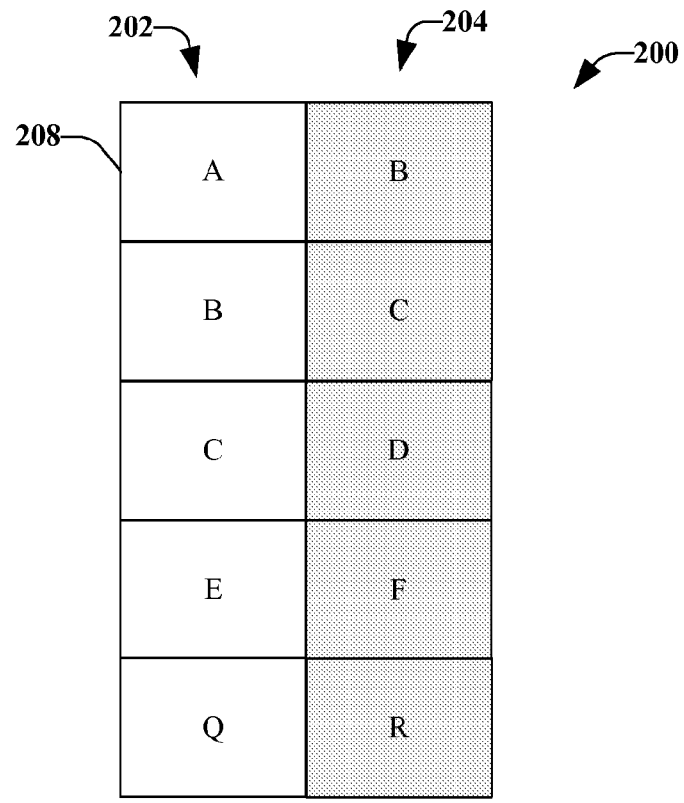
FIG. 2 illustrates an exemplary rules table.
Figure 2:
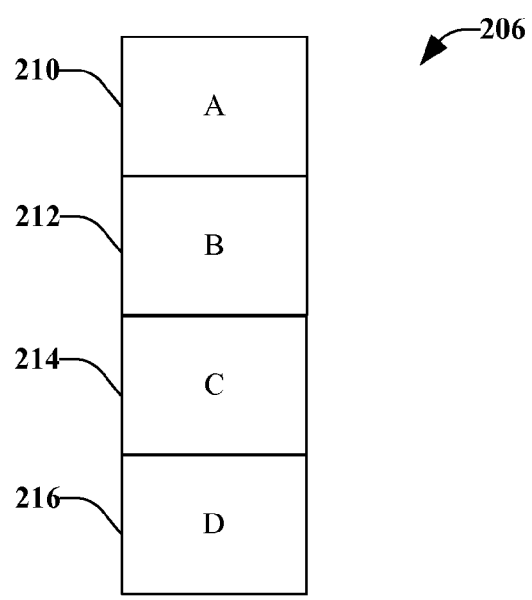

The mapping provided in the above example can be expressed as a table of rules, such as the exemplary rule table 200 illustrated in FIG. 2. The rule table 200 includes a data structure (shown in column format) where input claims 202 and information 204 that can be derived from the input claim (s) are applied to the data structure in order to expand the input claim(s) (or derived information) into subsequent output claims, which are illustrated in the results table 206 at the bottom of the figure.

Similar to the above example, a first input claim 208 is provided (or is known). The first input claim includes fact "A". Since "A" is known, it represents a first output claim 210, as illustrated in the results table 208. During a first iteration, "A" is applied to the data structure and "B" is determined (e.g., because "B" can be derived from fact "A" in accordance with the data structure. The information associated with "B" is placed in the results table 206 as a second output claim 212. "B" is then applied to the data structure (as derived information or as a new input claim) and "C" is determined, which is the third output claim 214. During another iteration, "D" is derived, based on knowledge of "C", and, therefore, "D" is a fourth output claim 216, in this example. Thus, an input claim can be expanded into one or more output claims (e.g., if "A" did not map to anything in the data structure, there would only be a single output claim, "A"). In this example, "A" was mapped or expanded to "B", "C", and "D".

Figure 3:
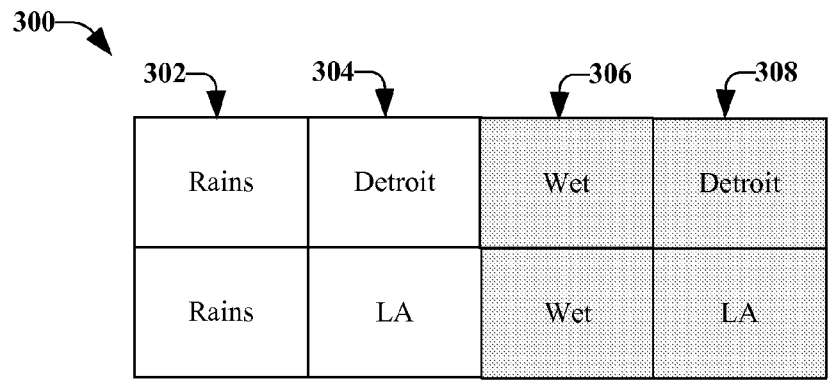
FIG. 3 illustrates another non-limiting exemplary rules table.

FIG. 3 illustrates another non-limiting exemplary rules table 300 as applied to the rain example discussed above. In this example, the following applies:

Rains(Detroit)→Wet(Detroit)
Rains(LA)→Wet(LA)

Figure 4:
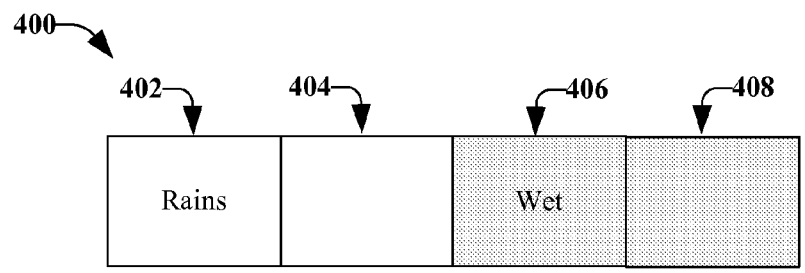
FIG. 4 illustrates an example of the application of predicate logic as it relates to tables.

The input claims are illustrated in columns 302 and 304, which are utilized to derive the output claims illustrated in columns 306 and 308. Further, as discussed above, the following applies:

Rains(X)→Wet(X)

where X is a variable. The application of predicate logic as it relates to tables is shown in the rule table 400 of FIG. 4, where columns represent a first input claim 402 and a second input claim 404 and columns represent a first output claim 406 and a second output claim 408. In this example, the second input claim 404 is a variable and, therefore, the information provided for the second input claim is transferred directly to the second output claim 408.

Figure 5:
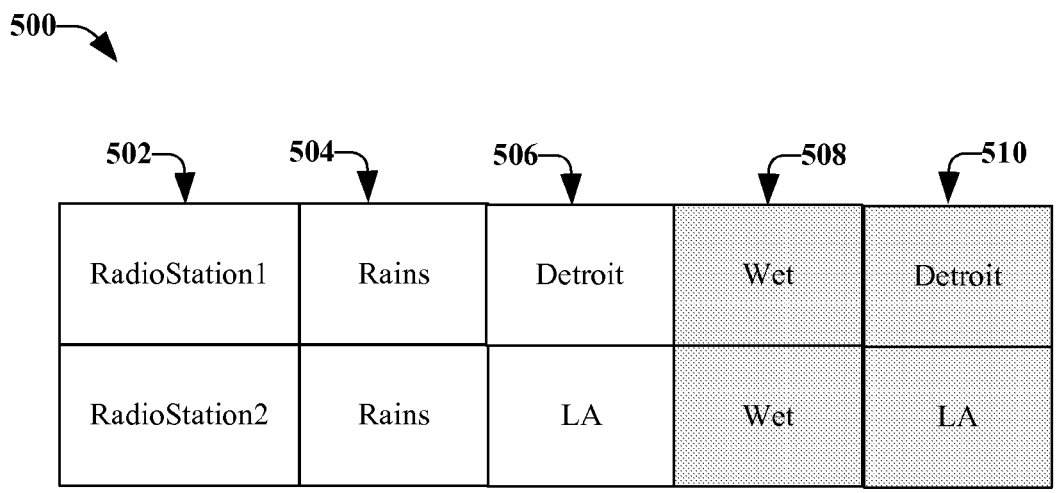
FIG. 5 illustrates an example of trust logic applied to a rules table.

Further, in the trust logic example discussed above, the following applies, as illustrated in the rules table 500 of FIG. 5.

RadioStation1 says Rains(Detroit)→Wet(Detroit)
RadioStation2 says Rains(LA)→Wet(LA)

For this example of trust logic applied to a rules table, columns 502, 504, and 506 are facts associated with input claims and columns 508 and 510 are output claims.

Figure 6:
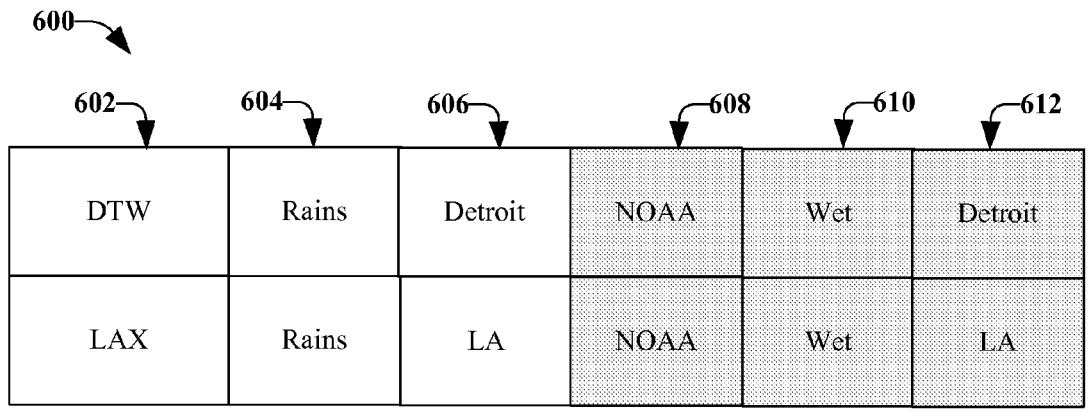
FIG. 6 illustrates a rules table that provides another example of trust logic.

In another example, FIG. 6 illustrates a rules table 600 for various weather conditions as provided by airports, which is another example of trust logic applied to a rules table, wherein the weather forecast by the airports are trusted. Thus, "If DTW says it is raining in Detroit, then NOAA says it is raining in Detroit" and "If LAX says it is raining in LA, then NOAA says it is raining in LA."

DTW says Rains(Detroit)→NOAA says Rains(Detroit)
LAX says Rains(LA)→NOAA says Wet(LA)

The input claims are illustrated in columns 602, 604, and 606. Based on the input claims, output claims, illustrated in columns 608, 610, and 612 can be derived. In an example, facts associated with an input claim can be a signature (or other identifying information) of DTW or a signature of LAX.

Figure 7:
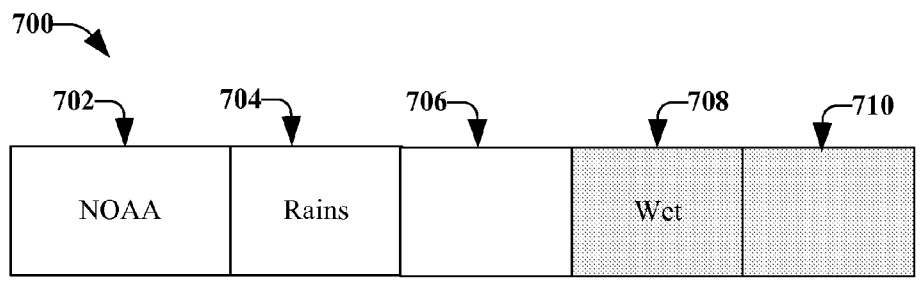
FIG. 7 illustrates another example of predicate logic in the form of a rules table.

As another example of predicate logic in the form of a rules table, the following applies, as illustrated in the rules table 700 of FIG. 7.

NOAA says Rains(X)→Wet(X)

where X is a variable. By being provided (or by deriving) the input claims (or facts associated with the input claims), illustrated in columns 702, 704, and 706, output claims, illustrated in columns 708 and 710 can be derived. The fact associated with input claim 706 is a variable and, thus, can be mapped directly to output claim 710.

The following provides examples related to conjunction. As it relates to logic, a logical conjunction results in something that is true if both of its operands (e.g., input claims) are true, otherwise the value is false.

In a first example, the following is given: "If it is raining and it is warm, then the grass will grow", which can be expressed as:

Rains & Warm→Grow

Therefore, if the conjunction of both "Rains" and "Warm" is true, then it is logical to state that the grass grows. However, if only one element (or input claim) is satisfied (e.g., either rains or warm, but not both), then it is not logical to state that the grass grows.

In another example, the following theory is provided:

A→B
B→C
A&C→D
A&E→F
A&G→H

Based on the above and given "A" and "E", "B" can be determined because A→B. By knowing "E", "F" can be determined because A & E→F. Further, "C" can be determined because B→C. Also, "D" can be determined because A & C→D.

Figure 8:
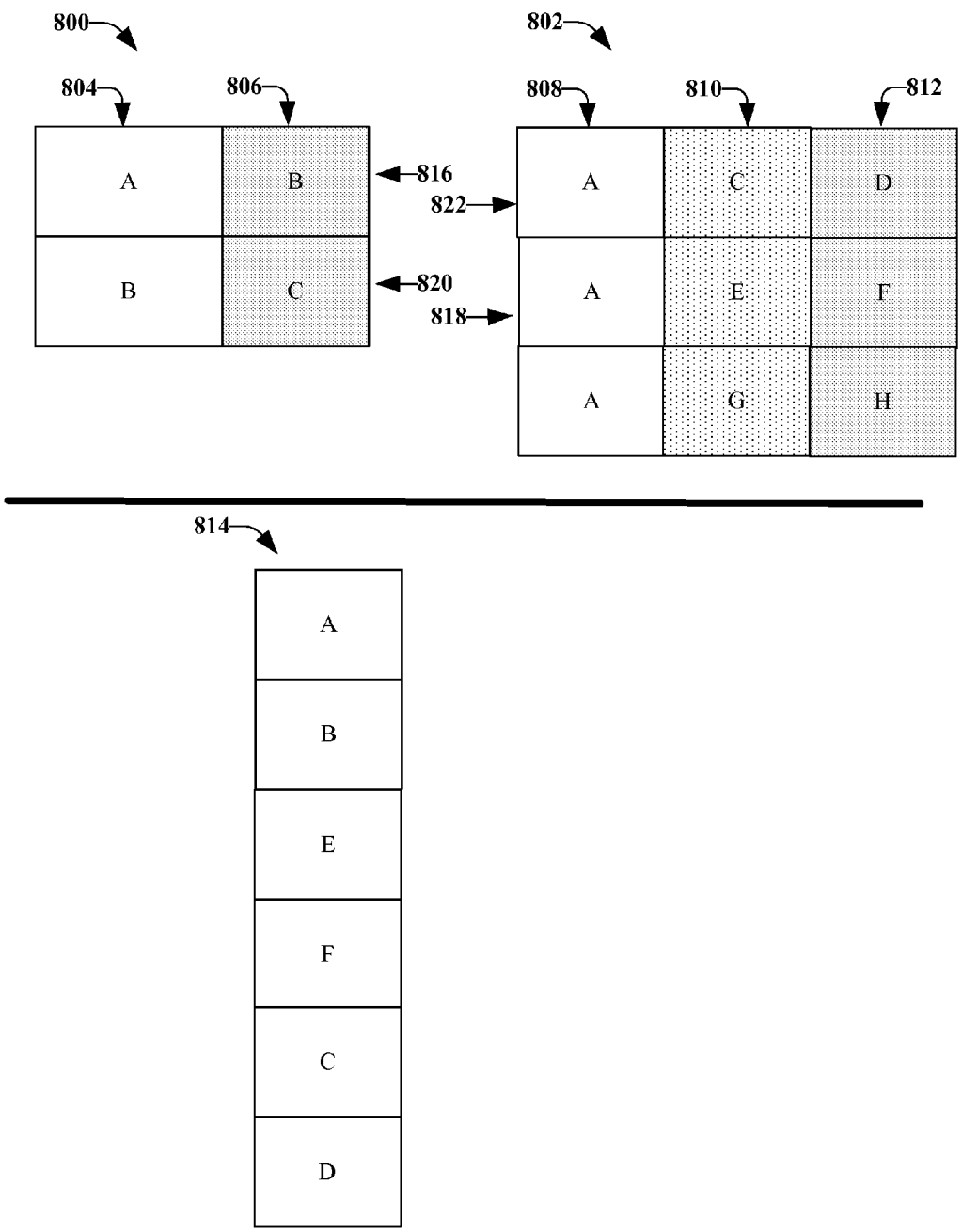
FIG. 8 illustrates conjunction expressed in table format, according to an aspect.

Conjunction, as demonstrated in the above example, can be expressed in table format, as shown in FIG. 8. In this case and by applying the data structure provided above, there are two rules tables 800 and 802, where each table is a different size. According to an aspect, the rule tables can be dynamically created as a function of a received input (e.g., input claims, a proposition, a theory, and so forth). In an example, the one or more rule tables can be created by a claims processing component (such as claims processing component 110 of FIG. 1).

The first rules table 800 is utilized for a single input and a single output. The second rules table 802 is utilized for conjunction, where two inputs claims are to be satisfied in order to derive an output. It is noted that although only two inputs claims are shown, more than two inputs claims can be utilized with the disclosed aspects (e.g., three or more input claims are to be satisfied in order to derive an output, and so forth).

In the first rules table 800 known or derived facts (e.g., input claims) of column 804 can be expanded into results (e.g., output claims) of column 806. In the second rules table 802, known or derived facts (e.g., input claims), illustrated in columns 808 and 810 are conjunctive and, therefore, both facts in a particular row are to be satisfied to render an output claim, shown in column 812. The result of the expansion of the input claims (e.g., facts of column 804 or columns 808 and 810) to the output claims is shown in the results table 814 at the bottom of the figure.

Stepping through the above example with respect to the tables 800 and 802, facts "A" and "E" are provided. During a first iteration, since "A" is known, "B" can be derived, based on the first row 816 of the illustrated first rules table 800. Further, since both "A" and "E" are known, "F" can be derived based on indicated row 818 in the second rules table 802. Further, since "B" is known (e.g., was derived from "A"), "C" can be derived based on the second row 820 in the illustrated first rules table 800. In a subsequent iteration, since both "A" and "C" are known, "D" can be derived from the first row 822 in the illustrated second rules table 802. Although the results or output has been described as a series of iterations, in some aspects iterations having a different order can be utilized. For example, in a first iteration "B" can be determined, in a second iteration "F" can be determined (since "A" and "E" are known), and so forth. In another example, "F" can be derived, and then "B" can be derived, and so forth.

Figure 9:
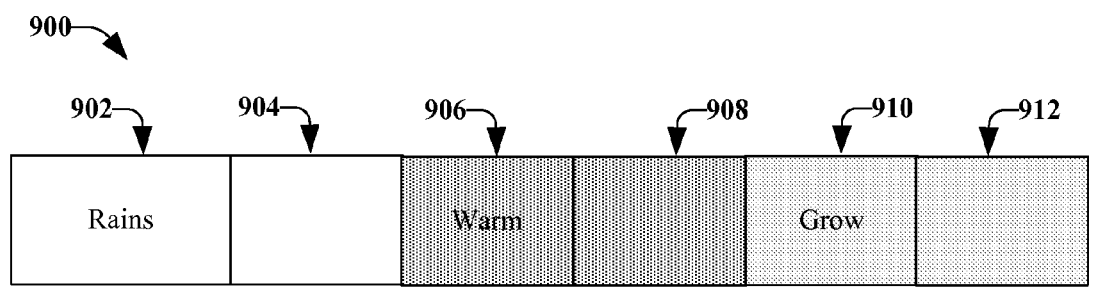
FIG. 9 illustrates an example of a rules table in accordance with an aspect.

In another example, the proposition "If it is raining somewhere and it is warm there, then the grass will grow there" can be represented by the rules table of FIG. 9. Input claims are represented in columns 902, 904, 906, and 908. Columns 902 and 904 represent a first input pair (or set-oriented approach) and columns 906 and 908 represent a second input pair (or set-oriented approach). In this example, columns 904 and 908 represents a variable (e.g., location for this example). The output, if both the first input pair and the second input pair is satisfied, is represented by columns 910 and 912, where column 912 represents a variable, which corresponds to the variables of column 904 and 908. For example, if it is raining in Tampa, the term "Tampa" is placed in columns 904 and, if it is warm in Tampa, the term "Tampa" is placed in column 908. Since columns 904 and 908 match, "Tampa" would be placed in column 912.

Figure 10:
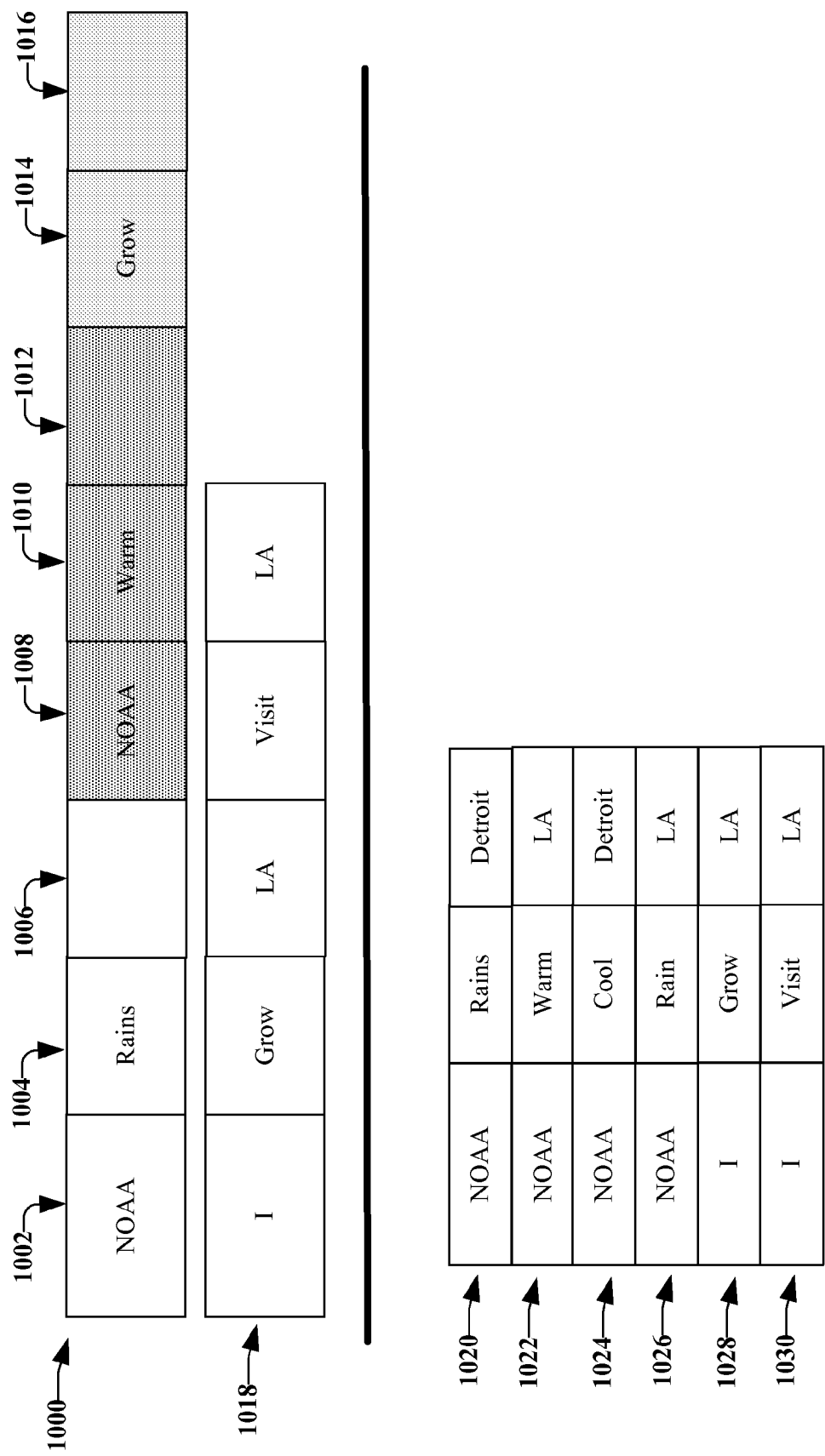
FIG. 10 illustrates a proposition employing conjunction expressed in a rules table, according to an aspect.

As another example of conjunction and its use with rule tables, FIG. 10 illustrates an example, non-limiting representation of an example of predicate logic related to weather. In this example, the proposition is: "If NOAA says it is raining "somewhere" and NOAA says it is warm "there", then the grass will grow there", where "somewhere" and "there" are variables. This proposition can be expressed in the first rules table 1000 shown in FIG. 10.

Thus, facts of a first input claim are represented in columns 1002, 1004, and 1006, where 1006 represents a variable. Further, facts of a second input claim are represented in columns 1008, 1010, and 1012, where 1012 represents a variable. An output claim for the row is represented by columns 1014 and 1016, where column 1016 represents a variable, which is mapped based on columns 1006 and 1012. The second rules table 1018, is related to the proposition "If the grass grows in LA, I will visit LA.

The following facts are provided and are placed into table format: "NOAA says it is raining in Detroit", represented by row 1020, "NOAA says it is warm in LA", represented by row 1022, "NOAA says it is cool in Detroit", represented by row 1024, and "NOAA says it is raining in LA", represented by row 1026. Based on these facts, the rules table 1000 is utilized to determine if the grass is growing in either Detroit or LA.

By analysis of the rules table, since it is raining and is warm in LA (see rows 1022 and 1026), then the grass grows in LA since both conditions of the rules table 1000 is satisfied. Applying the knowledge that the grass grows in LA to the rules table 1018, the output of row 1028 can be determined and, based on this determination, it can be derived that I will visit LA, as represented in row 1030.

Figure 11:
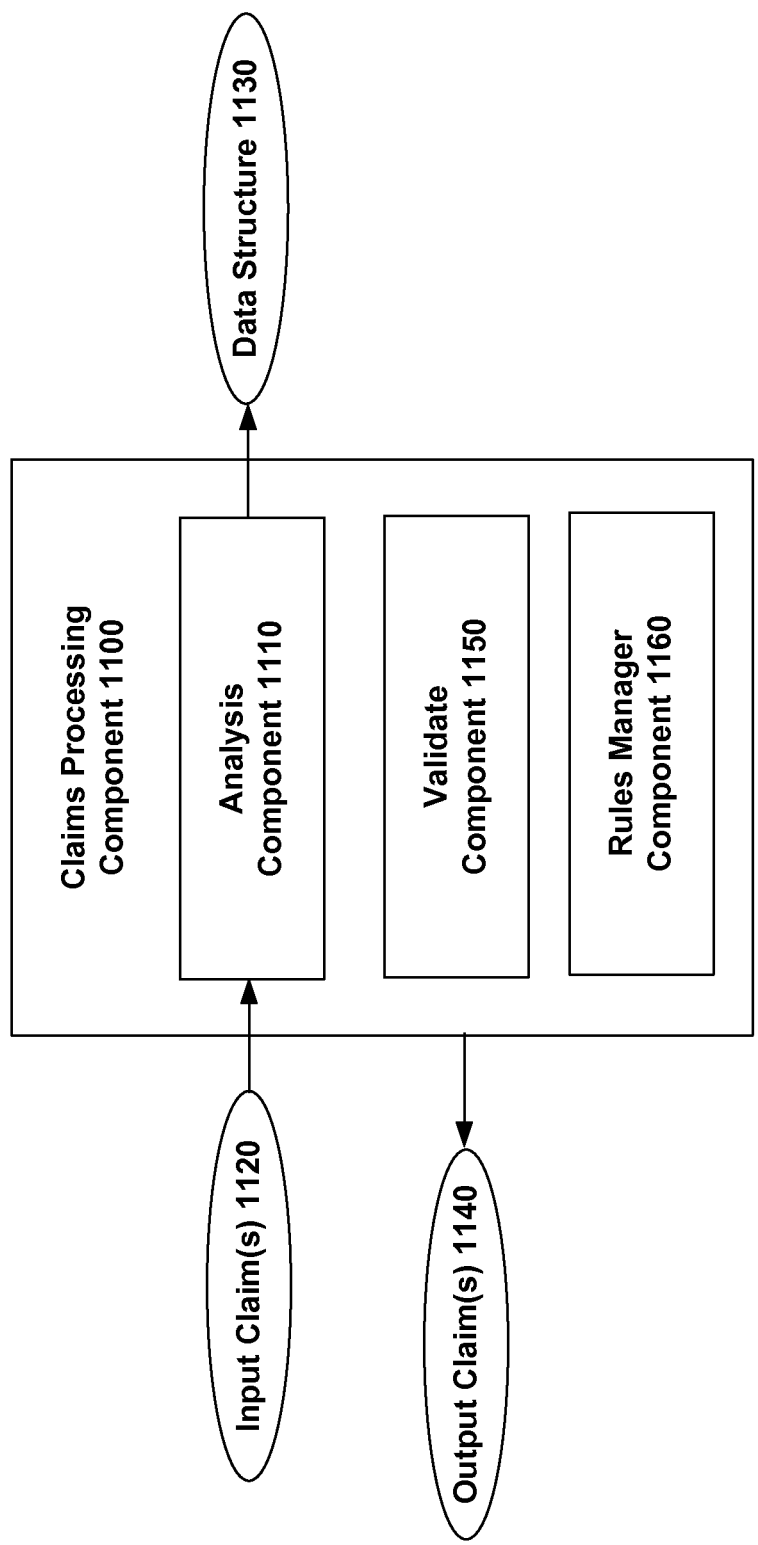
FIG. 11 illustrates a claims processing component, according to an aspect.

FIG. 11 illustrates a claims processing component 1100, according to an aspect. The claims processing component 1100 is similar to claims processing component 110 of FIG. 1. The claims processing component 1100 is configured to expand two or more input claims into one output claim or a set of output claims. In an example, the two or more input claims can be associated with a device (e.g., a user device, a communications apparatus, and so forth). According to an aspect, input claim(s) and output claim(s) include identity information signed by an issuer.

Included in claims processing component 1100 is an analysis component 1110 configured to apply facts associated with the two or more input claims 1120 against a data structure 1130. For example, facts associated with one or more of the two or more input claims can include an identification (e.g., user identification), which can be received in various forms including a user name/password pair or other identifying information (e.g., biometrics). Other examples of facts include, an email alias, a domain name alias, an Internet Protocol (IP) address. In some examples, the facts can include keywords and/or phrases.

The data structure 1130 can include a rules table (such as the rules tables shown and described above) or multiple rules tables. For example, the rules table(s) can include rows, wherein one or more elements of the rule are to be satisfied in order to render an output. In an example, the row can include two inputs, both of which are to be satisfied in order to render an output. In accordance with some aspects, more than two input claims are to be satisfied to render one or more output claims. By application of the facts associated with the two or more input claims 1120 against the data structure 1130, the two or more input claims can be expanded into one output claim or a set of output claims 1140.

In accordance with some aspects, analysis component 1110 is configured to apply the facts against the data structure at each iteration. The following example is with reference to FIG. 8 and given the fact "A". During a first iteration, fact "A" (associated with an input claim) is applied to the rules table 800 and "B" is determined (and included in an output claim). During a second iteration, since "A" and "E" are known, "F" is determined. During a third iteration, "C" is determined, and during a fourth iteration, "D" is determined. Thus, at each iteration, analysis component 1110 applies the facts are applied against the data structure (or rules table 800 in this example) in order to expand the input claims into output claims.

In some aspects, a validate component 1150 is configured to verify a matching row in a rules table for a plurality of the two or more input claims. Based on the verification, the claims processing component 1100 is configured to create a first output claim. In an example, the claims processing component 1100 is configured to produce a first output claim by matching a first input claim, a second input claim, or both the first input claim and the second input claim (e.g., conjunction) with a row (e.g., matched row) in a rules table. The claims processing component 1100 is further configured to assign a type and a value of the matched row to the first output claim. For example, the type and the value can be expressed as variables, wherein the variables of one or more input claims are applied to the output claim(s). However, the disclosed aspects are not limited to this example and other values associated with a type and a value of the input claim(s) can be assigned to the first output claim.

Also included in the claims processing component 1100 is a rules manager component 1160, according to an aspect. The rules manager component 1160 can be configured to capture rules, including notions of trust and conjunctions. The rules manager component 1160 can create the data structure 1130 based on the rules. In an aspect, the rules can be captured in separate tables by the rules manager component 1160. For example, rules can be rows in a relational database table. Each row can contain an input claim type and value, output claim type and value, and the issuer of the input claim. In some aspects, it is assumed that the rules are static for the brief period of time that the search is being conducted.

Figure 12:
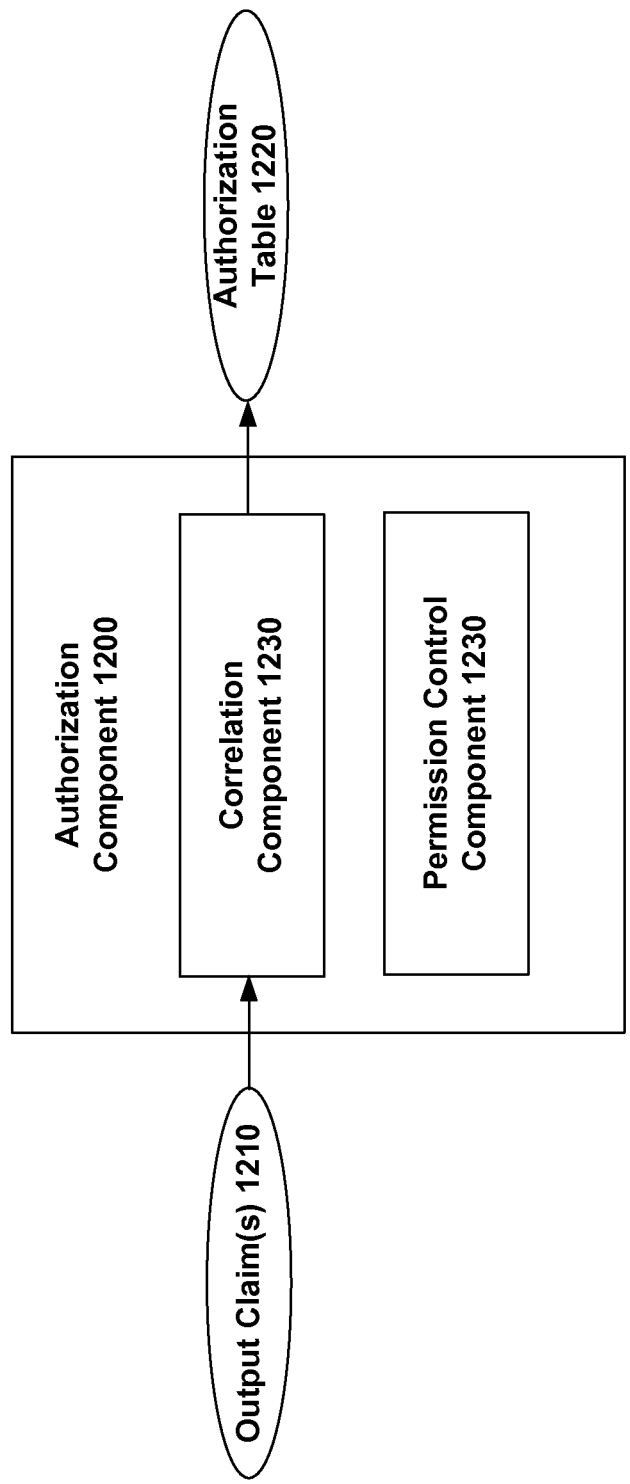
FIG. 12 illustrates an example authorization component, according to an aspect.

FIG. 12 illustrates an example authorization component 1200, according to an aspect. The authorization component 1200 is similar to authorization component 140 of FIG. 1. The authorization component 1200 is configured to match a set of output claims 1210 (e.g., output claims 1140 of FIG. 11) to an authorization table 1220 for rows that contain matching resource claim(s), subject claim(s), and action claim(s). The matching is utilized to indicate the device is authorized to access the system and/or system resource(s). In an aspect, the authorization table 1220 comprises a plurality of rows, where each row comprises a resource claim, a subject claim, and an action claim. For example, the resource claim can include information related to a resource to which the user can have access, the subject claim can include information related to the resource, and the action can include information related to what the user can do with the resource (e.g., what actions can be performed by the user).

Also included in authorization component 1200 is a permission control component 1230 that is configured to selectively allow access to the system and/or system resource(s) based on the result of the matching performed by authorization component 1220. If authorization component 1200 did not match the output claim(s) to a row in the authorization table 1220, authorization is not allowed and permission control component 1230 denies access to the system and/or system resource(s). If access is denied, permission control component 1230 can provide an error message or other indication to the user of the denial.

Figure 13:
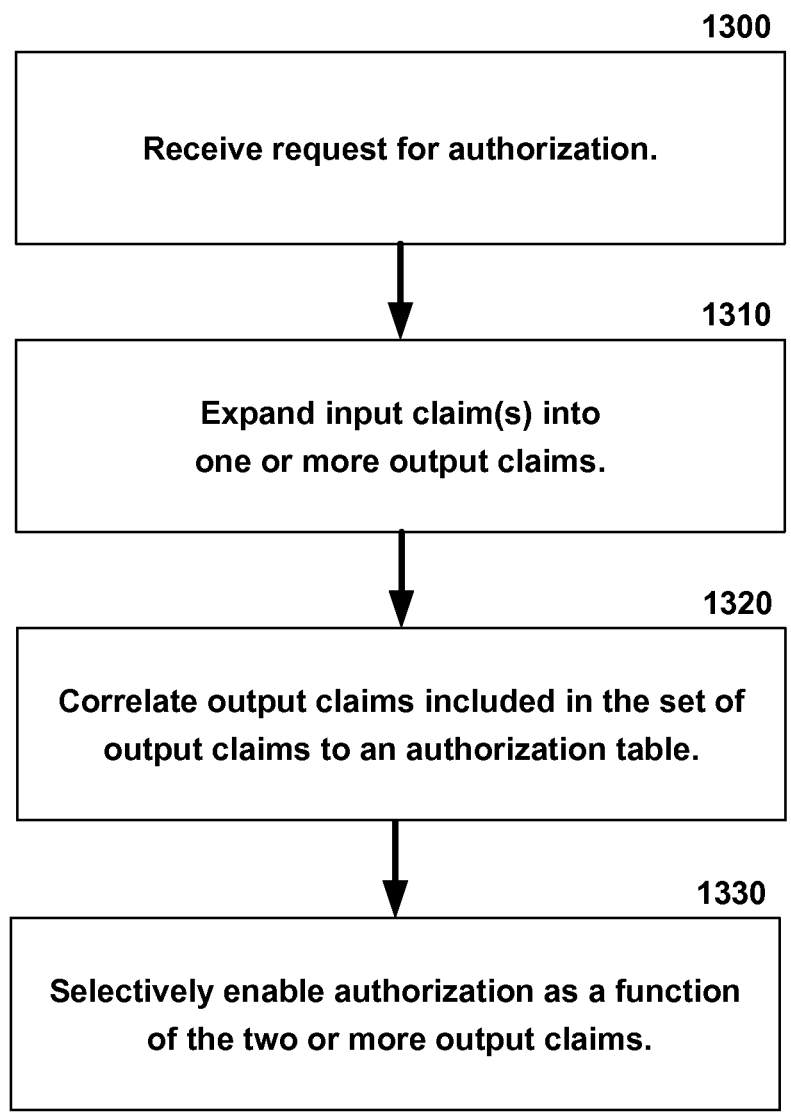
FIG. 13 illustrates a non-limiting flow diagram of claim transformation for access control management, according to an aspect.

FIG. 13 illustrates a non-limiting flow diagram 1300 of claim transformation for access control management, according to an aspect. A request for authorization is received 1300. The request for authorization can be received when a user access a device, when the user attempts to access a system resource, and/or at another time when authorization is desired. In some aspects, authorization initiation can be based on receipt of two or more input claims. The claims (e.g., input claims, output claims) can include a piece of identity information that is signed by an issuer.

At 1310, the two or more input claims are expanded into one or more output claims. For example, a first input claim and a second input claim can be expanded into a possible set (e.g., one or more) of output claims. At 1320, at least a subset (e.g., one or more) of output claims in the set of output claims are correlated to an authorization table. As a result of the correlating, an action for the first input claim and the second input claim are authorized, at 1330, and one or more actions are authorized.

In accordance with some aspects, expanding the two or more input claims, at 1310, includes verifying a row in a rules table matches the first input claim and the second input claim (e.g., the conjunction is satisfied) and creating a first output claim as a function of the verifying. In an aspect, the expanding includes corresponding an input issuer, a type, and a value of the first input claim or the second input claim with a row in a rules table. In some aspects, the conjunction (or join function) can be set-oriented.

According to some aspects, the authorizing the action, at 1330 includes evaluating the set of output claims against an authorization table that comprises rows. The evaluation is performed based on rows that comprises a resource claim, a subject claim, and an action claim. The authorization is allowed based on the evaluation.

Figure 14:
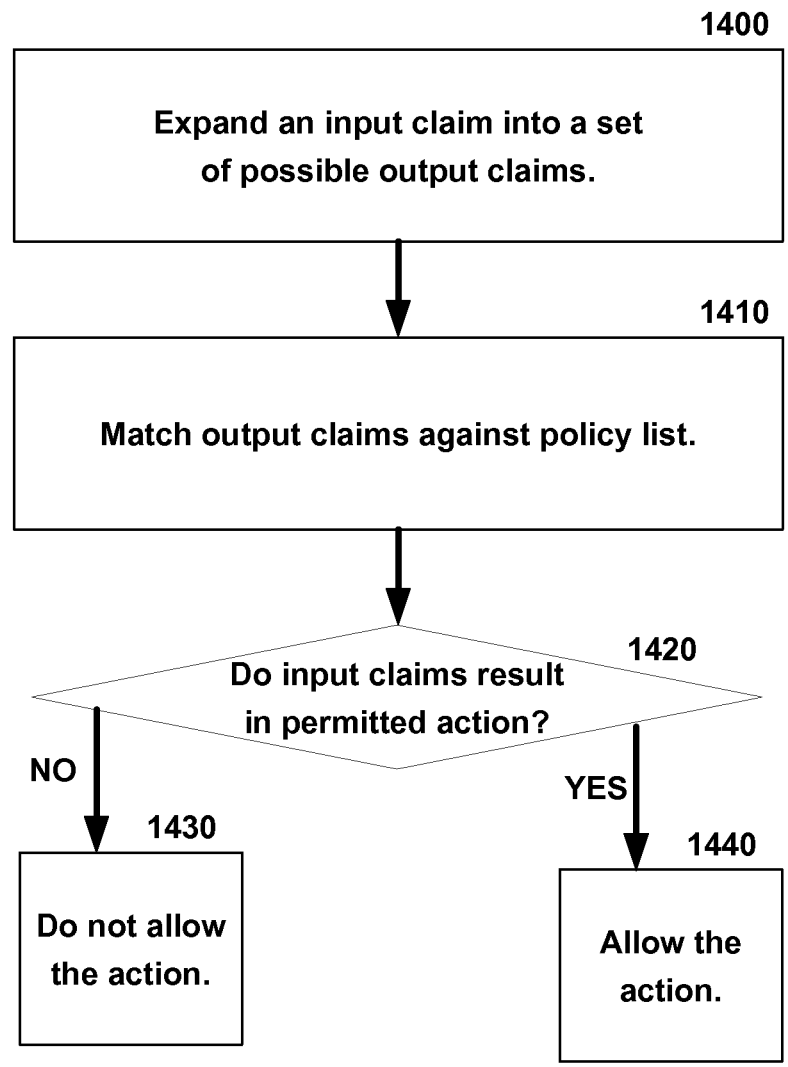
FIG. 14 illustrates a non-limiting flow diagram of claim transformation, according to an aspect.

FIG. 14 illustrates a non-limiting flow diagram of claim transformation, according to an aspect. At 1400, an input claim is expanded into a set of possible output claims. At 1410, the output claims are matched against an authorization table. For example, at each iteration, new (output) claims are created by taking each current claim (e.g., an input claim or an output claim) and determining if there is a matching row in the rules table with the same input issuer, type, and value. Thus, during each iteration the current set of input claims and produced (or derived) claims are matched against all the rules. If the determination is that there is a matching row, an output claim with the same type and value as the matching row, and with issuer LOCAL AUTHORITY is produced. In an aspect, the issuer, LOCAL AUTHORITY, is utilized to identify the apparatus, system, or method that matched the input claims and produced the one or more output claims.

To determine if the input claims result in a permitted action, at 1420, the set of output claims are matched against the authorization table for rows that contain the matching resource claim, subject claim, and action claim. If a match does not exist ("NO"), at 1430 the action is not allowed. If a match exists ("YES"), at 1440, the user is authorized.

Figure 15:
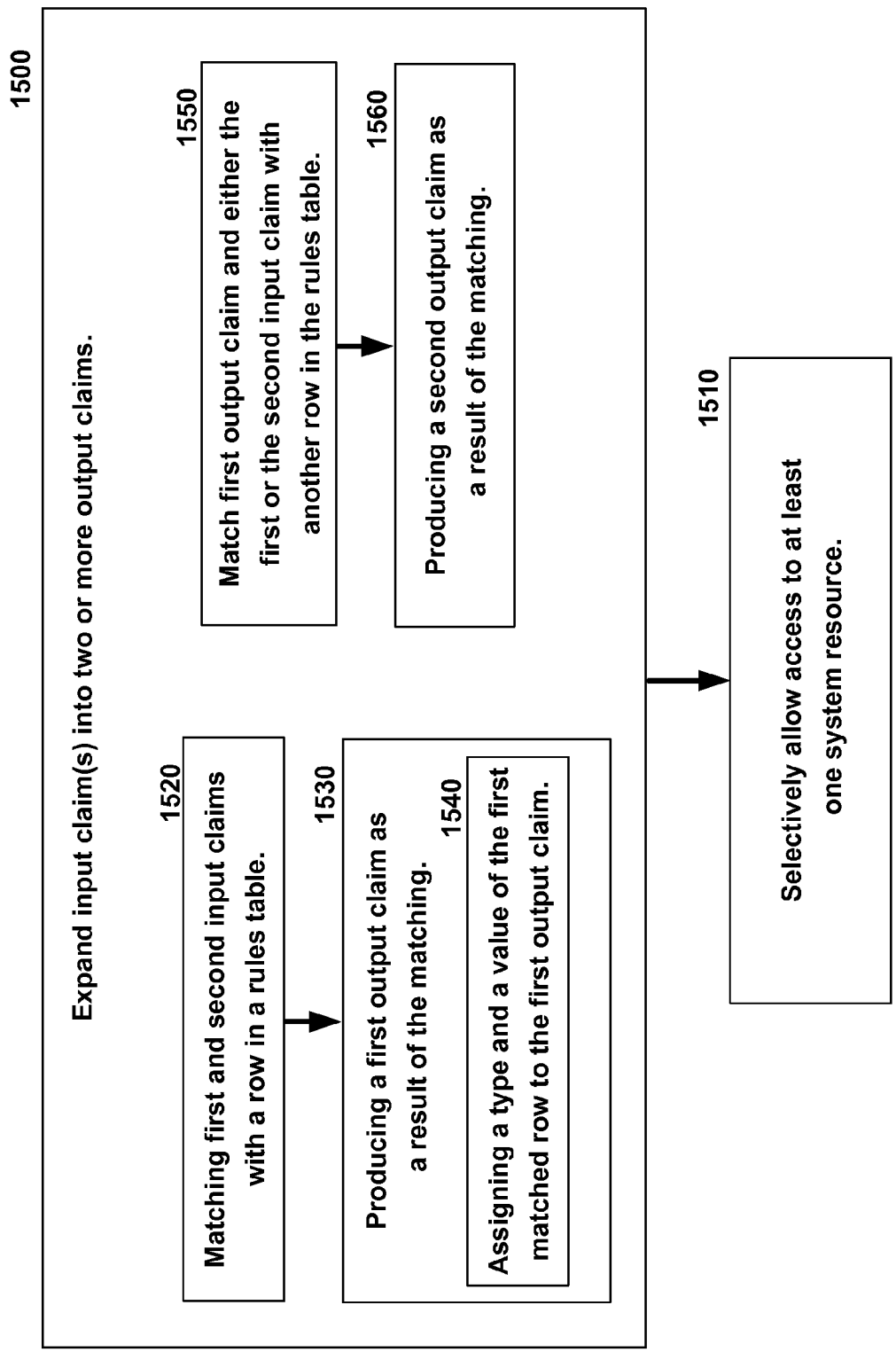
FIG. 15 illustrates a non-limiting flow diagram for access control management, according to an aspect.

FIG. 15 illustrates a non-limiting flow diagram for access control management, according to an aspect. At 1500, based on a request for access to at least one system resource, two or more input claims are expanded into one or more output claims. As a function of the set of output claims, access to at least one system resource is selectively allowed, at 1510.

According to some aspects, the expanding can include matching the first input claim and the second input claim with a row in a rules table, at 1520, and producing a first output claim, at 1530, as a result of the matching. According to some aspects, the producing includes, at 1540, assigning a type and a value of the first matched row to the first output claim.

According to some aspects, at 1500, the expanding includes matching the first output claim and one of the first input claim or the second input claim with another row in the rules table, at 1550. Further to this aspect, a second output claim is produced, at 1560, as a result of the matching. The second output claim comprises a type and a value of the second matched row.

As discussed above, authorization, or access control, can be based on a determination of permissions that can be granted for an action(s) to be performed on a resource. The determination of the permission can be based on a set of rules that represent a theory including a notion of trust that has been divided into different sized tables. The tables can be utilized to evaluate two or more input claims and to facilitate a determination of whether access to at least one system resource is to be granted. The evaluation can include matching the two or more input claims to rows in the table, wherein access is allowed if a match is found. The disclosed aspects can be performed through efficient representation and a decision procedure over the representation that exploits aspects of the representation.

Exemplary Networked and Distributed Environments

One of ordinary skill in the art can appreciate that the various embodiments of the access control systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects, or resources that may participate in the access control and execution mechanisms as described for various embodiments of the subject disclosure.

Figure 16:
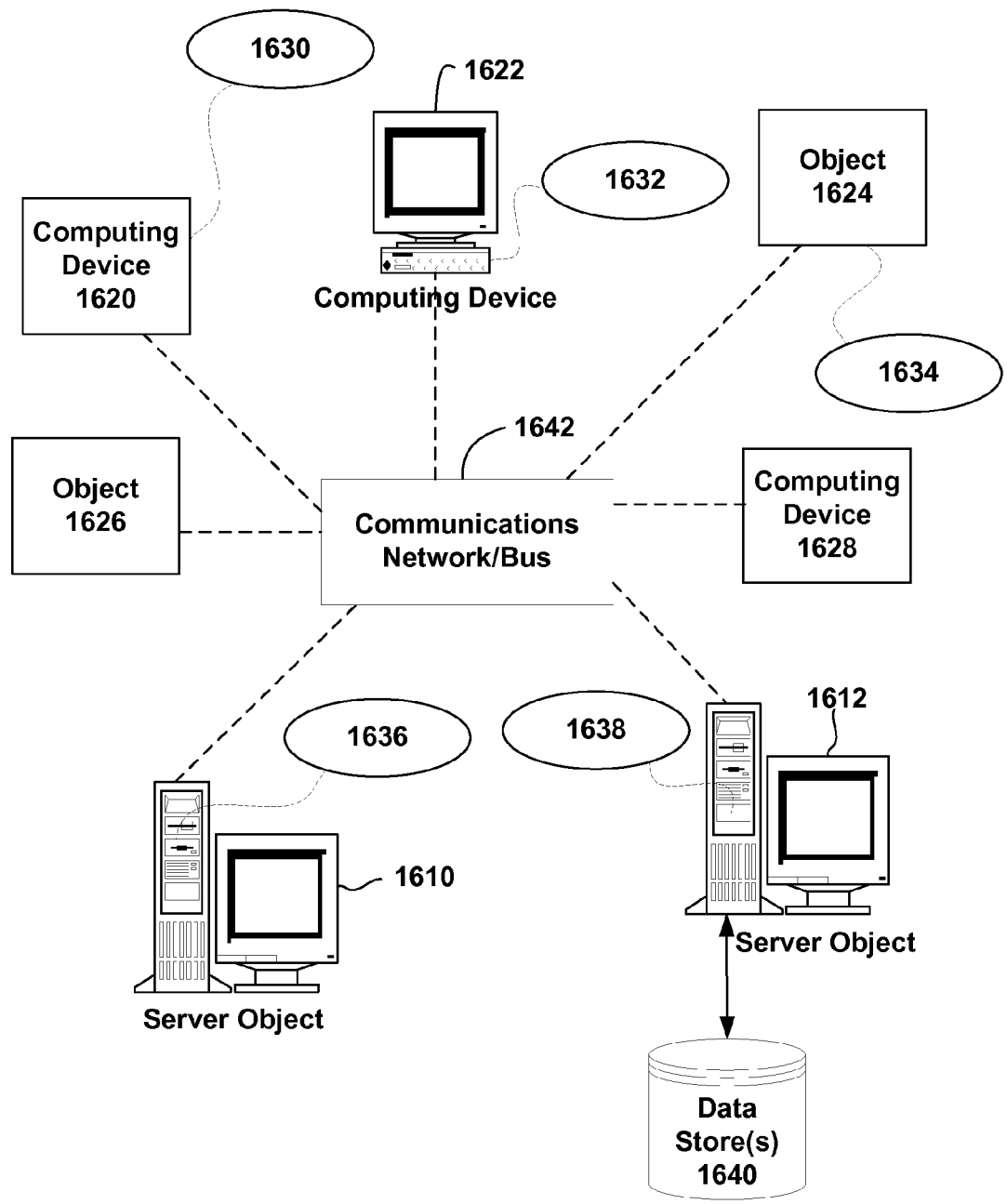
FIG. 16 is a block diagram representing exemplary non-limiting networked environments in which various embodiments described herein can be implemented.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638 and data store(s) 1640. It can be appreciated that computing objects 1610, 1612, etc. and computing objects or devices 1620, 1622, 1624, 1626, 1628, etc. may comprise different devices, such as personal digital assistants (PDAs), audio/video devices, mobile phones, MP3 players, personal computers, laptops, etc.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1642, either directly or indirectly. Even though illustrated as a single element in FIG. 16, communications network 1642 may comprise other computing objects and computing devices that provide services to the system of FIG. 16, and/or may represent multiple interconnected networks, which are not shown. Each computing object 1610, 1612, etc. or computing object or devices 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the access control and management techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, although any network infrastructure can be used for exemplary communications made incident to the access control management systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc., acting as servers provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1642 or bus is the Internet, for example, the computing objects 1610, 1612, etc. can be Web servers with which other computing objects or devices 1620, 1622, 1624, 1626, 1628, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, 1628, etc., as may be characteristic of a distributed computing environment.

Exemplary Computing Device

As mentioned, advantageously, the techniques described herein can be applied to any device where it is desirable to perform access control management in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 17 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 17:
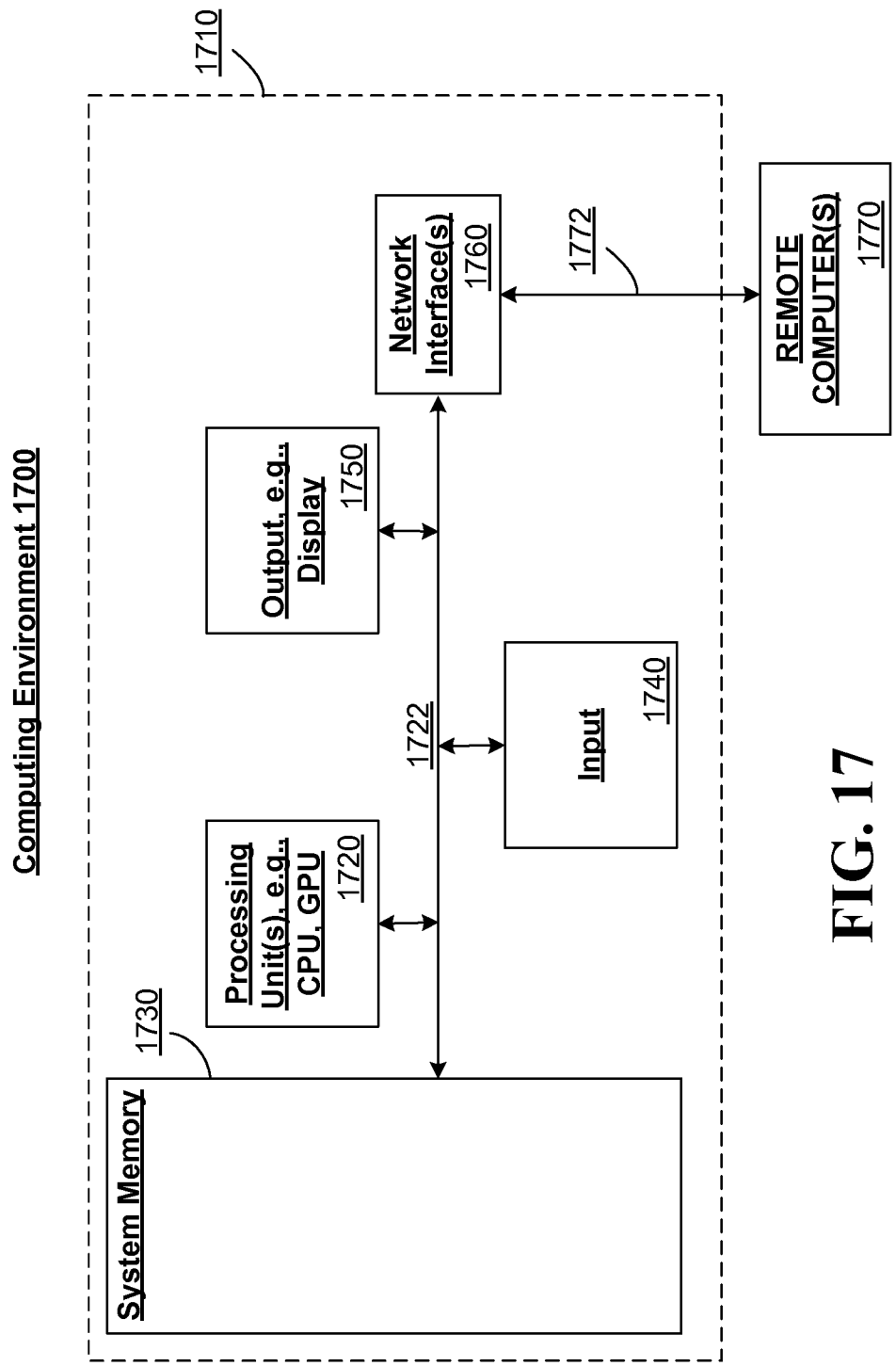
FIG. 17 is a block diagram representing an exemplary non-limiting computing system or operating environment in which one or more aspects of various embodiments described herein can be implemented.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. Neither should the computing system environment 1700 be interpreted as having any dependency or requirement relating to any one or combination of components illustrated in the exemplary computing system environment 1700.

With reference to FIG. 17, an exemplary remote device for implementing one or more embodiments includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, system memory 1730 may also include an operating system, application programs, other program modules, and program data. According to a further example, computer 1710 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1710 through input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections, such as network interfaces 1760, to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. An access control system, comprising a claims processing component configured to expand two or more input claims associated with a device into a set of output claims used to selectively authorize access to system resources by applying facts associated with the two or more input claims against a data structure to expand the two or more input claims into one or more output claims and thereafter iteratively applying a fact associated with the two or more input claims and a fact associated with at least one of the one or more output claims against the data structure to further expand the two or more input claims into the set of output claims; and an authorization component configured to match the set of output claims to an authorization table for rows that contain a matching resource claim, a matching subject claim, and a matching action claim to indicate the device is authorized to access a particular system resource;

wherein the claims processing component is configured to produce a first output claim by matching a first input claim, a second input claim, or both the first input claim and the second input claim with at least one row in a rules table;

wherein the claims processing component is configured to assign a type and a value of the matched row to the first output claim.

2. The access control system of claim 1, wherein the authorization component is further configured to match the set of output claims to an authorization table.

3. The access control system of claim 1, wherein the claims processing component is configured to verify a matching row in a rules table for a plurality of the two or more input claims and to create a first output claim.

4. The access control system of claim 1, wherein the authorization component is configured to match the set of output claims against the authorization table and to allow access to the system resource.

5. The access control system of claim 4, wherein the authorization table comprises a plurality of rows, wherein each row comprises a resource claim, a subject claim, and an action claim.

6. The access control system of claim 1, wherein an input claim and an output claim comprises identity information signed by an issuer.

7. A method, comprising:
receiving an authorization request;
using a processing unit, expanding a first input claim and a second input claim into a set of output claims used to selectively authorize access to system resources, wherein the expanding further comprises:
matching the first input claim and the second input claim with a row in a rules table;
producing a first output claim based on the matching;
matching the first output claim and either the first input claim or the second input claim with another row in the rules table; and
producing a second output claim as a result of the matching, wherein the second output claim comprises a type and a value of the another row;
using the processing unit, correlating a plurality of output claims in the set of output claims to an authorization table; and
authorizing an action for the first input claim and the second input claim as a result of the correlating.

8. The method of claim 7, wherein the expanding comprises:
verifying a row in a rules table matches the first input claim and the second input claim; and
creating the first output claim as a function of the verifying.

9. The method of claim 7, wherein the producing comprises:
assigning a type and a value of the matched row to the first output claim.

10. The method of claim 7, wherein the expanding further comprises corresponding an input issuer, a type, and a value of the first input claim or the second input claim with a row in a rules table.

11. The method of claim 7, wherein the authorizing the action comprises:
evaluating the set of output claims against an authorization table that comprises rows based on at least one row that comprises a resource claim, a subject claim, and an action claim; and
allowing authorization as a function of an output of the evaluating.

12. A computer-readable storage memory comprising computer-executable instructions stored therein that, in response to execution, cause a computing system to perform operations, comprising:
expanding two or more input claims associated with a device into a set of output claims by applying facts associated with the two or more input claims against a data structure to expand the two or more input claims into one or more output claims and thereafter iteratively applying a fact associated with the two or more input claims and a fact associated with at least one of the one or more output claims against the data structure to further expand the two or more input claims into the set of output claims; and
corresponding the set of output claims to an authorization table for rows that include a matching resource claim, subject claim, and action claim to indicate the device is authorized to access a system resource.

13. The computer-readable storage memory of claim 12, where the two or more input claims and the set of output claims comprise a piece of identity information signed by an issuer.

* * * * *